United States Patent
Damsaz et al.

(10) Patent No.: US 10,940,793 B1
(45) Date of Patent: Mar. 9, 2021

(54) INGRESS AND EGRESS FOR AUTONOMOUS VEHICLE

(71) Applicant: Ford Global Technologies, LLC, Dearborn, MI (US)

(72) Inventors: Mahrdad Damsaz, Dexter, MI (US); Mostafa Parchami, Dearborn, MI (US); Chandana Neerukonda, Mountain View, CA (US); Krithika Swaminathan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/561,951

(22) Filed: Sep. 5, 2019

(51) Int. Cl.
*B60Q 1/32* (2006.01)
*B60Q 9/00* (2006.01)
*E05B 77/08* (2014.01)
*G06Q 10/02* (2012.01)
*H04W 4/44* (2018.01)
*G06Q 50/30* (2012.01)
*G06K 9/00* (2006.01)

(52) U.S. Cl.
CPC ............ *B60Q 1/323* (2013.01); *B60Q 9/00* (2013.01); *E05B 77/08* (2013.01); *G06K 9/00805* (2013.01); *G06Q 10/02* (2013.01); *G06Q 50/30* (2013.01); *H04W 4/44* (2018.02)

(58) Field of Classification Search
CPC .......... B60Q 1/323; B60Q 9/00; B60Q 10/02; G06K 9/00805; H04W 4/44; H04W 4/42; G06Q 50/30; E05B 77/08
See application file for complete search history.

(56) References Cited

U.S. PATENT DOCUMENTS

| | | | |
|---|---|---|---|
| 7,202,776 B2 | 4/2007 | Breed | |
| 7,586,402 B2 | 9/2009 | Bihler et al. | |
| 9,377,315 B2 | 6/2016 | Grover et al. | |
| 9,508,260 B2 | 11/2016 | Shaik | |
| 9,625,906 B2 | 4/2017 | Meuleau et al. | |
| 9,637,965 B1* | 5/2017 | Kothari | B60J 5/0493 |
| 9,723,428 B2* | 8/2017 | Park | H04W 4/42 |
| 9,777,528 B2 | 10/2017 | Elie et al. | |
| 9,805,602 B2 | 10/2017 | Tobolski et al. | |
| 9,805,605 B2 | 10/2017 | Ramanujam | |
| 9,809,218 B2 | 11/2017 | Elie et al. | |
| 9,836,057 B2 | 12/2017 | Fairfield et al. | |
| 10,046,760 B2 | 8/2018 | Elie et al. | |

(Continued)

FOREIGN PATENT DOCUMENTS

WO      2018132088 A1     7/2018

*Primary Examiner* — Ryan W Sherwin
(74) *Attorney, Agent, or Firm* — Frank A. MacKenzie; Bejin Bieneman PLC (57) ABSTRACT

A ride-share system is disclosed. The system may comprise: one or more processors and memory storing instructions that are executable by the one or more processors, the instructions comprising: while operating a vehicle in an autonomous mode, determine a transit stop; based on the determination, attempt to establish communication with a smart node; when communication is established with the smart node, query the smart node regarding whether to actuate a vehicle door to an open position; and when communication is not established with the smart node, determine whether to actuate the vehicle door to the open position.

17 Claims, 6 Drawing Sheets

(56) References Cited

U.S. PATENT DOCUMENTS

| | | | |
|---|---|---|---|
| 10,088,326 B1 | 10/2018 | Aula et al. | |
| 10,089,872 B1 | 10/2018 | Beaurepaire | |
| 10,242,457 B1 | 3/2019 | Sibley | |
| 10,286,904 B2 | 5/2019 | Yaldo et al. | |
| 2010/0284196 A1* | 11/2010 | Lin | B60Q 1/323 |
| | | | 362/501 |
| 2011/0112969 A1* | 5/2011 | Zaid | G06Q 10/02 |
| | | | 705/50 |
| 2013/0147615 A1* | 6/2013 | Chen | B60Q 1/302 |
| | | | 340/425.5 |
| 2014/0049405 A1* | 2/2014 | Breuer | G01N 21/35 |
| | | | 340/905 |
| 2015/0344028 A1 | 12/2015 | Gieseke et al. | |
| 2016/0174024 A1* | 6/2016 | Gavin | H04W 4/44 |
| | | | 455/456.3 |
| 2017/0030128 A1 | 2/2017 | Elie et al. | |
| 2017/0210282 A1* | 7/2017 | Rodriguez Barros | B60Q 1/484 |
| 2018/0075754 A1* | 3/2018 | Salter | H04W 4/029 |
| 2018/0188037 A1 | 7/2018 | Wheeler et al. | |
| 2018/0373236 A1 | 12/2018 | Ewert | |
| 2019/0023207 A1 | 1/2019 | Lambermont et al. | |
| 2019/0026572 A1* | 1/2019 | Theodosis | G06K 9/00805 |
| 2019/0139411 A1 | 5/2019 | Dhull et al. | |
| 2019/0394626 A1* | 12/2019 | Hitotsumatsu | H04W 4/38 |
| 2020/0074159 A1* | 3/2020 | Ohnishi | G06K 9/00348 |

\* cited by examiner

- 610 Determine static and dynamic object interference data
- 620 Low passenger collision risk?
  - Yes → 630 Illuminate footpath zone between vehicle and transit stop → 640 Actuate door(s) to open position → 650 Permit passenger ingress/egress → 660 Actuate doors to a closed position → FIG. 5 510
  - No → 670 Notify passenger(s) to manually open doors and alert passenger(s) of potential hazard → 650 Permit passenger ingress/egress From FIG. 5 550

FIG. 8

INGRESS AND EGRESS FOR AUTONOMOUS VEHICLE

BACKGROUND

A public transportation vehicle (e.g., such as a taxi or city bus) may have doors which open at least partially outwardly of the vehicle. And when a human driver operates such a vehicle and/or opens the doors, the driver or user typically anticipates a possibility of a cyclist, pedestrian, etc. within a path of the vehicle's doors. For example, the driver may wait until the collision hazard passes, and then open the doors to permit boarding/unboarding. Still further, even if the doors do not open outwardly of the vehicle, the driver or user may wait to open the doors until such a cyclist or the like is no longer on an imminent collision course with passengers who may board or unboard the vehicle via the doors. In a context of an autonomous vehicle (i.e., one operating without a human driver but instead using a computer to control the vehicle), human intuition is absent and there exists a need to mitigate such potential collisions.

DETAILED DESCRIPTION

A ride-share system is described in detail below that includes a vehicle—operating in an autonomous mode—having onboard a computer, one or more processors and memory storing instructions that are executable by the one or more processors, the instructions comprising: while operating a vehicle in an autonomous mode, determine a transit stop; based on the determination, attempt to establish communication with a smart node; when communication is established with the smart node, query the smart node regarding whether to actuate a vehicle door to an open position; and when communication is not established with the smart node, determine whether to actuate the vehicle door to the open position.

According to the at least one example set forth above, further comprising a vehicle door actuator that moves a door between the open position and a closed position, wherein the vehicle door actuator is communicatively coupled to the one or more processors.

According to the at least one example set forth above, further comprising: a light source directed to illuminate a footpath zone of the vehicle; a positioning device that configured to identify a location of the vehicle; a wireless communication device; and a passenger notification system, wherein the light source, the positioning device, the wireless communication device and the passenger notification system are communicatively coupled to the one or more processors.

According to the at least one example set forth above, the instructions further comprise, to: receive a ride-share request, wherein the request pertains to a passenger pick-up or a passenger drop-off.

According to the at least one example set forth above, the query is executed when a transmission of the vehicle is in a PARK state.

According to the at least one example set forth above, the instructions further comprise, to: provide, to the smart node, a location of the vehicle and vehicle dimensions.

According to the at least one example set forth above, the instructions further comprise, to: receive, from the smart node, an affirmative response indicating to actuate the vehicle door to the open position; and then actuate the vehicle door to the open position to permit passenger ingress or passenger egress.

According to the at least one example set forth above, the instructions further comprise, to: illuminate a footpath zone of the vehicle; and actuate the vehicle door to the closed position.

According to the at least one example set forth above, the instructions further comprise, to: receive, from the smart node, a negative response indicating to not actuate the vehicle door to the open position; and then, provide a notification to passenger(s) to manually open the vehicle door.

According to the at least one example set forth above, the instructions further comprise, to: provide a notification to the passenger(s) regarding a potential hazard.

According to the at least one example set forth above, the potential hazard is an object moving into a footpath zone of the vehicle or a pole or other static structure.

According to the at least one example set forth above, the object comprises a cyclist, a walking or running pedestrian, a physically-impaired pedestrian, a person on roller skates or roller blades, a person on a scooter, or a person on a hoverboard.

According to the at least one example set forth above, when communication is not established with the smart node, the instructions further comprise, to: determine object interference information with respect to a footpath zone of the vehicle; based on object interference information, determine to actuate the vehicle door to the open position; actuate a light source of the vehicle to illuminate the footpath zone; and actuate the vehicle door to the open position to permit passenger ingress or passenger egress.

According to the at least one example set forth above, when communication is not established with the smart node, the instructions further comprise, to: determine object interference information with respect to a footpath zone of the vehicle; based on object interference information, determine to not actuate the vehicle door to the open position; and provide a notification to passenger(s) to manually open the vehicle door.

According to the at least one example set forth above, the instructions further comprise, to: provide a notification to the passenger(s) regarding a potential hazard.

According to the at least one example set forth above, the potential hazard is an object moving into a footpath zone of the vehicle or a pole or other static structure.

According to the at least one example set forth above, the object comprises a cyclist, a walking or running pedestrian, a physically-impaired pedestrian, a person on roller skates or roller blades, a person on a scooter, or a person on a hoverboard.

According to at least one additional illustrative example, a ride-share system is disclosed. The system comprises: one or more processors and memory storing instructions that are executable by the one or more processors, the instructions comprising: receive at a smart node, from a vehicle, a query requesting whether to actuate a vehicle door to an open position; using sensor data, determine, at the smart node, whether to affirm or negative the query; when the determination is to affirm, then send a response, from the smart node, to the vehicle to actuate the vehicle door to the open position; and when the determination is to negative, then send a response, from the smart node, to the vehicle to not actuate the vehicle door to the open position.

According to the at least one example set forth above, when communication is not established with the smart node, the instructions further comprise, to: when the determination is to affirm, then illuminate a footpath zone of the vehicle.

According to the at least one example set forth above, wherein the instructions further comprise, to: steer a light source of the smart node in order to illuminate the footpath zone.

According to the at least one example, a computer program product is disclosed that includes a computer readable medium that stores instructions executable by a computer processor, wherein the instructions include any combination of the examples of the instruction(s) set forth above.

According to at least one example, a method is claimed which includes any combination of the instructions set forth above.

Turning now to the figures wherein like reference numerals denote like or similar elements, features or functions, a ride-share system 10 is shown that comprises a vehicle 12—operating in an autonomous mode—comprising a computer 14 and, in at least some examples, at least one smart node 16 which, as described herein, is configured to communicate with the vehicle 12 in order to facilitate passenger ingress and/or egress (hereafter, 'ingress/egress'). As will be explained in greater detail below, the computer 14 may be programmed to determine when a passenger wishes to ingress/egress at a transit stop identified by the passenger. (In the context of this disclosure, a passenger is a human who is being transported by vehicle 12 (and wishes to egress the vehicle 12) or is a human who desires to be transported by vehicle 12 (and wishes to ingress the vehicle 12).) Thus, once the computer 14 determines that a passenger wishes to ingress/egress, the computer 14 may determine whether a smart node is nearby (e.g., within a range of short-range wireless communication). When at least one smart node 16 is nearby, the computer 14 may query the smart node 16 in order to determine whether to actuate a vehicle door to an open position to permit passenger ingress/egress. When the smart node 16 replies in the negative, the computer 14 (onboard vehicle 12) may advise passengers of a potential hazard with respect to a footpath zone (e.g., between the vehicle 12 and the transit stop) and have passengers manually operate the vehicle door. And when the smart node 16 replies in the affirmative, the computer 16 may actuate the vehicle door to the open position to permit passenger ingress/egress while the smart node 16 illuminates the footpath zone to indicate where passengers should walk.

In instances where vehicle 12 approaches a transit stop without a nearby smart node, computer 14 may assess potential hazards instead. When the computer 14 determines a potential hazard, the computer 14 may advise passengers of the potential hazard and have passengers manually operate the vehicle door. Similarly, when the computer 14 does not determine a potential hazard, the computer 14 may actuate the vehicle door to the open position and cause the footpath zone to be illuminated—thereby facilitating passenger ingress/egress. The computer-implemented processes executed by the vehicle computer 14 and the smart node 16 will be described in greater detail below following a description of the exemplary elements of the vehicle 12 and smart node 16, as well as an exemplary use-case environment.

Figure 1:
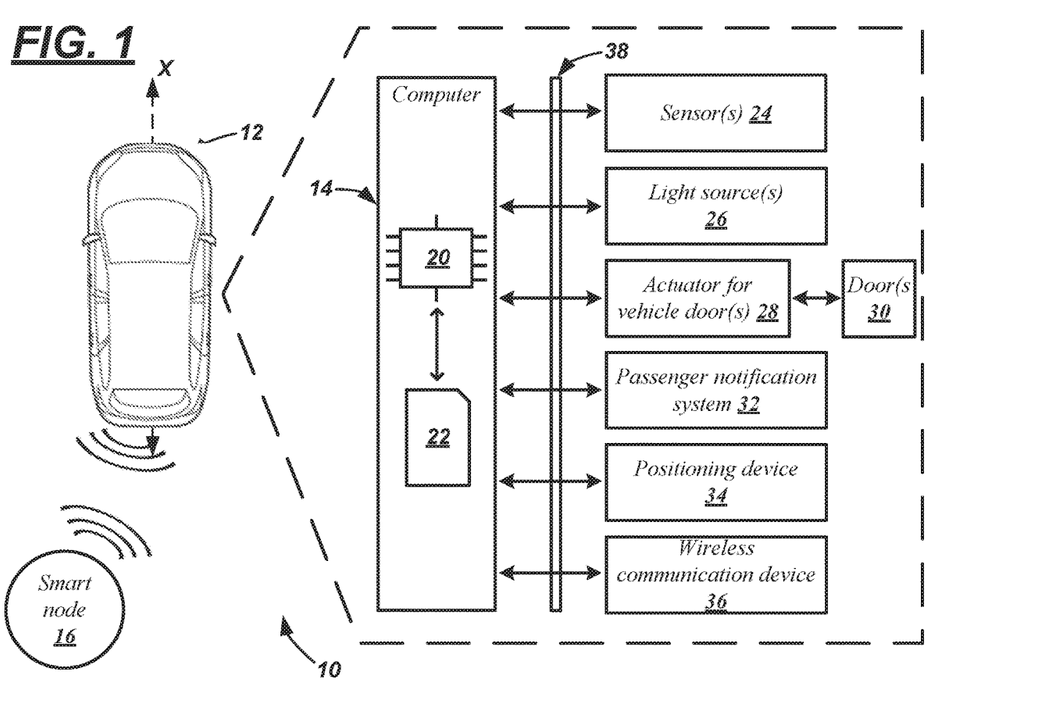
FIG. 1 is a schematic diagram of a ride-share system that includes a vehicle operating in an autonomous mode and, in some examples, at least one smart node that communicates with the vehicle.

FIG. 1 illustrates vehicle 12 as a passenger vehicle; however, vehicle 12 could be any other suitable vehicle type, including a truck, a sports utility vehicle (SUV), a recreational vehicle, a bus, a shuttle, a van or minivan, or the like that comprises the computer 14 programmed to facilitate passenger ingress/egress. In at least one example, the vehicle 12 is configured to operate in at least one of a plurality of autonomous modes, as defined by the Society of Automotive Engineers (SAE) (which has defined operation at levels 0-5). For example, vehicle 12 may receive and process two- and/or three-dimensional data of its surroundings and further may be programmed and/or configured to store and execute logic instructions embodied in hardware, software, firmware, a combination thereof, or the like, and to enable vehicle 12 to operate with some user assistance (partial autonomy) or without any user assistance (full autonomy). For example, according to levels 0-2, a human driver monitors or controls the majority of the driving tasks, often with no help from the vehicle 12. For example, at level 0 ("no automation"), a human driver is responsible for all vehicle operations. At level 1 ("driver assistance"), vehicle 12 sometimes assists with steering, acceleration, or braking, but the driver is still responsible for the vast majority of the vehicle control. At level 2 ("partial automation"), vehicle 12 can control steering, acceleration, and braking under certain circumstances without human interaction. At levels 3-5, vehicle 12 assumes more driving-related tasks. At level 3 ("conditional automation"), vehicle 12 can handle steering, acceleration, and braking under certain circumstances, as well as monitoring of the driving environment. Level 3 may require the driver to intervene occasionally, however. At level 4 ("high automation"), vehicle 12 can handle the same tasks as at level 3 but without relying on the driver to intervene in certain driving modes. At level 5 ("full automation"), vehicle 12 can handle all tasks without any driver intervention. In at least one example, vehicle 12 is configured to operate in a fully autonomous mode and/or serves as a ride-share vehicle for a variety of different daily passengers.

Computer 14 can be representative of a single computing device (e.g., oftentimes referred to as control module or an electronic control unit (ECU)) or multiple such computing devices. Whether it be one or many computing device, computer 14 is programmed to execute instructions to carry out the passenger ingress/egress processes described herein; and in some cases, computer 14 further may control autonomous driving (e.g., in the fully autonomous mode). Thus, computer 14 may comprise one or more processors 20 (one is shown for purposes of illustration) and memory 22.

Processor(s) 20 may be programmed to process and/or execute digital instructions to carry out at least some of the tasks described herein. Non-limiting examples of processor(s) 20 include a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 20 read from memory 22 and execute one or more sets of instructions (e.g., computer programs) which may be embodied as a computer program product stored on a non-transitory computer-readable storage medium (e.g., such as memory 22). Non-limiting examples of instructions will be described below in the processes illustrated using flow diagrams, wherein these and other instructions may be executed in any suitable sequence unless otherwise stated. These instructions and the example processes described below are merely embodiments and are not intended to be limiting.

Memory 22 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 22 may store one or more sets of instructions which may be embodied as software, firmware, or other programming instructions executable by the processor(s) 20—including but not limited to the instruction examples set forth herein. In operation, processor(s) 20 may read data from and/or write data to memory 22.

As shown in FIG. 1, computer 14 may communicate with and/or control one or more sensors 24, at least one light source 26, at least one actuator 28 for a vehicle door 30, a passenger notification system 32, a positioning device 34, and a wireless communication device 36. Communication with each of these devices may be facilitated via any suitable vehicle communication network 38. Each will be discussed in turn.

The one or more sensors 24 may be any suitable electronics used to gather sensor data regarding the surroundings of the vehicle 12 (and in some instances, within a cabin of vehicle 12). Sensor data may include situational awareness data and, more particularly, information regarding static and dynamic object interference data for one or more objects. The term object refers to physical objects—those having mass and occupying space. As used herein, static object interference data is information pertinent to whether a passenger ingressing or egressing the vehicle 12 is likely to collide with a stationary object (e.g., with regard to a stationary object, static object interference data may include a size, shape, and location of the object, as well as other characteristics thereof). And as used herein, dynamic object interference data is information pertinent to whether a passenger ingressing or egressing the vehicle 12 is likely to collide with a moving object (e.g., with regard to the moving object, dynamic object interference data may include a size, shape, location, speed, heading, historical path data, predicted path data, calculated potential collision event (e.g., with a passenger), etc. of the object, as well as other characteristics thereof). Non-limiting examples of sensors 24 include a camera sensor, a light detection and ranging (LIDAR) sensor, a millimeter (mm) radio detection and ranging (RADAR) sensor, a sound navigation and ranging (SONAR) or ultrasonic sensor, a thermal imaging sensor, and the like. Any combination of these types of sensors may be used.

Light source 26 is any electronic device which project light in at least a portion of the human visible spectrum. Non-limiting examples of light source 26 include an incandescent element, a light-emitting diode, a halogen element, or the like. In at least one example, the light source 26 is mounted on the vehicle 12 in order to direct the light toward the ground nearby the door(s) 30 (e.g., like a so-called puddle light). More particularly, the light source 26 may be directed to illuminate a footpath zone 40 (see FIG. 4) adjacent the vehicle door(s) 30 and extending outwardly from the vehicle 12 (e.g., typically having a width of 3-10 feet and a length of 3-5 feet; however, these dimensions are merely examples). In at least one example, the light source 26 emits red or other colored light which is sharp or highly-visible to the human eye. As described more below, light source 26 may be actuated when the computer 14 determines to actuate the vehicle door(s) 30 to permit passenger ingress/egress—thus, the illuminated ground may serve as an indicator to passengers that computer 14 has calculated that any collision of an outside object with ingressing/egressing passengers has a relatively low likelihood. It should be appreciated that while one light source 26 is shown, multiple light sources 26 may be arranged on the vehicle 12.

In at least one example, each actuator 28 for vehicle door(s) 30 may be identical; therefore, only one will be described herein. Actuator 28 comprises a mechanical or electro-mechanical link (not shown) which is configured to move one or more doors 30 from a first (open) position to a second (closed) position. Door 30 may be any suitable barrier which, in a closed position, encloses a passenger region (e.g., a cabin (not shown)) of vehicle 12). Actuator 28 is at least communicatively coupled to computer 14 and may move a pivotable door, a sliding door, or the like. A non-limiting commercially-available implementation of actuator 28 is a chain-driven powered sliding door by Strattec™. Of course, this is merely an example; other implementations are also possible.

Passenger notification system 32 may comprise any suitable electronic alert system which uses display, light, audio, or a combination thereof to notify passengers ingressing/egressing regarding their surroundings. Thus, the system 32 may be a display that flashes text and/or emits human synthesized speech with a predetermined message. In some examples, the system 32 is directed to passengers inside the vehicle 12; in other examples, the system 32 also can be directed to passengers outside the vehicle 12 (e.g., those about to board vehicle 12).

Positioning device 34 is any suitable electronic device used to determine location data and/or heading data of the vehicle 12. According to one example, positioning device 34 may have a tolerance of less than 30 centimeters (cm) when the vehicle is stationary; however, this is merely an example. Non-limiting examples of positioning system 34 include a Global Positioning System (GPS) unit or a Global Navigation Satellite System (GLONASS) device. As described below, location data may be received by computer 14 and then provided to smart node 16 in order to aid the smart node 16 in determining whether to advise the vehicle 12 to actuate the vehicle door 30 in order to permit passenger ingress/egress.

Wireless communication device 36 may comprise any suitable electronics hardware configured to send and receive wireless messages between the vehicle 12 and at least the smart node 16. According to one non-limiting example, wireless communication device 36 comprises at least one short-range wireless communication (SRWC) chipset (not shown) that enables the wireless communication device 36 to communicate via one or more of a Dedicated Short-Range Communication (DSRC) protocol, a Wi-Fi protocol, a Wi-Fi Direct protocol, a Bluetooth or Bluetooth Low Energy (BLE) protocol, or any other suitable SRWC protocol. It should be appreciated that the wireless communication device 36 may enable vehicle 12 to communicate with things other than smart node 16 such as vehicle-to-vehicle (V2V) communication, vehicle to mobile device communication, vehicle-to-everything (V2X) communications, and the like.

Vehicle communication network 38 of vehicle 12 may include any suitable wired or wireless network hardware enabling communication between computer 14 and electronics devices 24-36. In at least one example, the vehicle communication network 38 includes one or more of a controller area network (CAN) bus, Ethernet, Local Interconnect Network (LIN), or the like. In some examples, network 38 may comprise discrete connections instead (or in addition to a bus). Still further, wireless and other wired examples of network 38 also exist.

Figure 2:
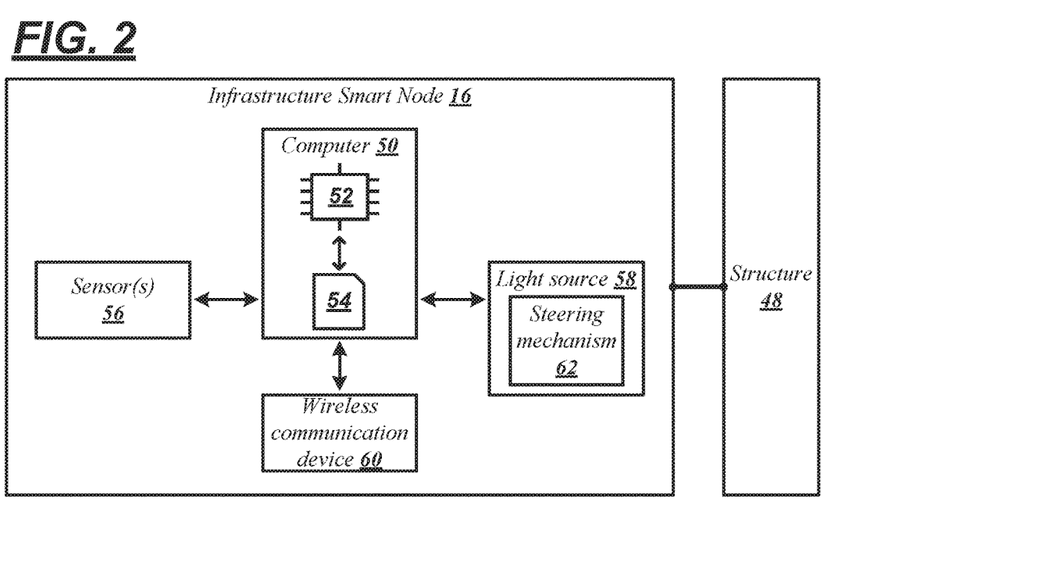
FIG. 2 is a schematic diagram illustrating an example of the smart node.

Turning now to FIG. 2, a non-limiting example of smart node 16 is illustrated schematically coupled to a structure 48. According to at least one example, smart node 16 is mounted to structure 48 so that it is spaced vertically with respect to vehicles (such as vehicle 12) as they determine and/or permit passenger ingress/egress. In this manner, smart node 16 may have a so-called bird's eye view, enabling it to sense moving objects which may be occluded from the point-of-view of the vehicle 12 (and its sensor(s) 24). For example, structure 48 may be a pole, a street lamp, a building, a bridge, or the like.

According to one non-limiting example, smart node 16 comprises a computer 50 (comprising at least one processor 52 and memory 54) that is configured to communicate with and/or control one or more sensors 56, a light source 58, and a wireless communication device 60. Each component will be discussed in turn.

According to one example, the hardware of computer 50 may be identical to the hardware of computer 14 (i.e., the at least one processor 52 may comprise the same or similar hardware as processor(s) 20, and memory 54 may comprise the same or similar hardware as memory 22); therefore, such hardware will not be re-explained in detail. However, processor 52 may execute a unique set of instructions which are stored in memory 54, and as described in at least one process set forth below (shown schematically in FIG. 8), computer 50 may assist in facilitating passenger ingress/egress at vehicle 12.

According to one example, the one or more sensors 56 may be similar to and/or even identical to sensor(s) 24. Therefore, these sensors 56 will not be re-described in detail herein. In at least some examples, any millimeter RADAR sensors may be mounted approximately 2-3 meters (m) above a ground level and any LIDAR or camera sensors may be mounted approximately 4-6 m above ground level. These distances are merely examples however. Regardless of their mounted heights, sensors 56 may have a better vantage point than vehicle 12 (and be able to sense objects which may be occluded from the point-of-view of vehicle 12).

According to one example, the light source 58 may have similar features as light source 26. Therefore, light source 58 will not be re-described in detail herein. However, in at least one example, light source 58 further may comprise a steering mechanism 62 which can be controlled by computer 50 to steer a beam of light toward the footpath zone 40 of vehicle 12, as described more below. Non-limiting examples of the steering mechanism 62 comprise a gimbal, pan-tilt mechanism, or the like.

According to one example, the wireless communication device 60 may be similar to and/or even identical to wireless communication device 36. Therefore, wireless communication device 60 will not be re-described in detail herein.

Figure 3:
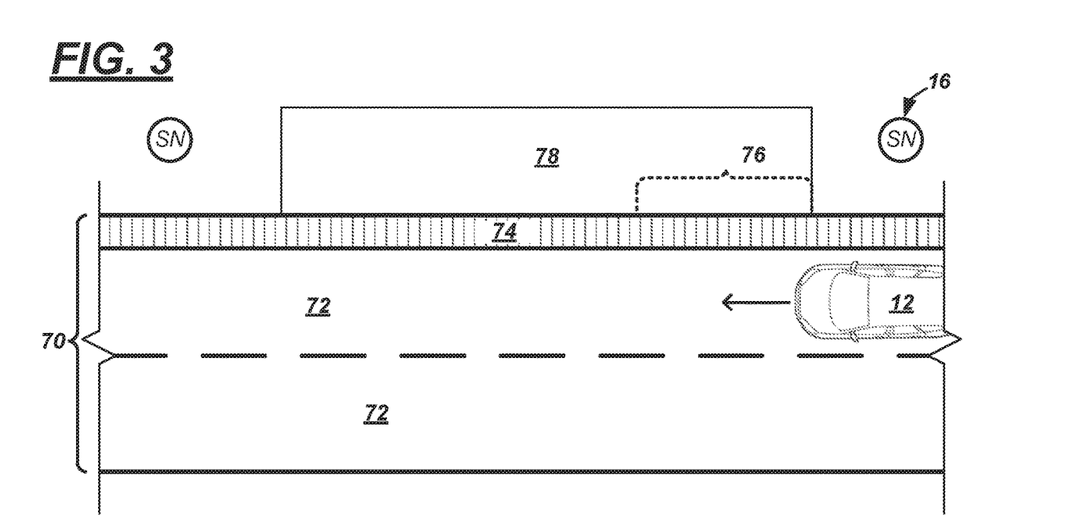
FIG. 3 is a schematic diagram illustrating a roadway (that includes a bicycle lane) and a region of a transit stop having two smart nodes, wherein the vehicle is approaching the transit stop.
Figure 4:
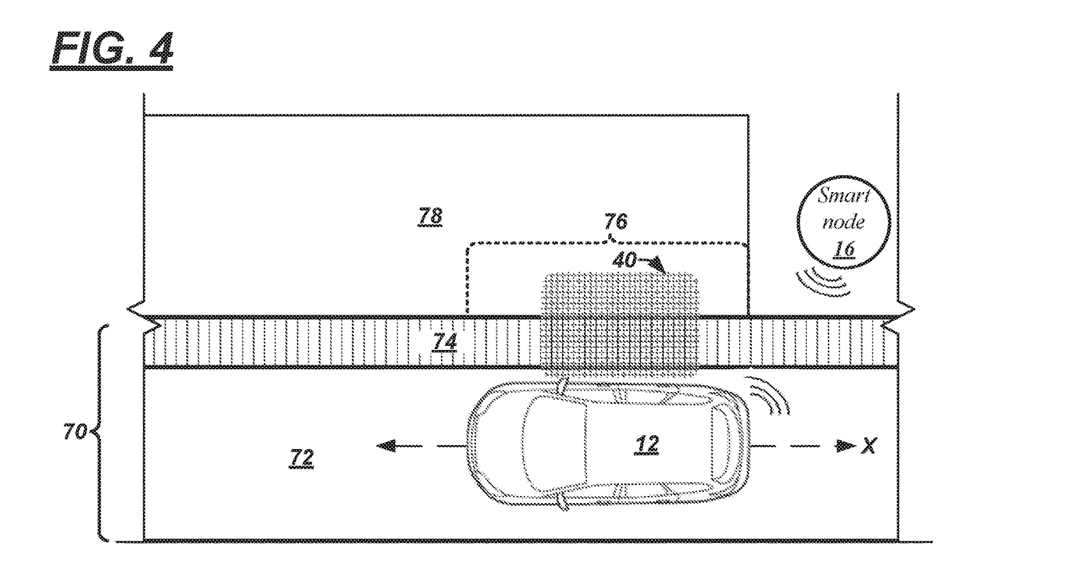
FIG. 4 is a schematic diagram illustrating an enlargement of a portion of FIG. 3, wherein the vehicle is stopped at the transit stop.

Turning now to FIGS. 3-4, an example use-case scenario is illustrated. More particularly, FIG. 3 is a schematic diagram illustrating a vehicle roadway 70 that comprises one or more vehicle lanes 72 and a bicycle or pedestrian lane 74 and a region 76 of a transit stop 78 having two exemplary smart nodes (SN) 16, wherein the vehicle 12 is approaching the transit stop 78, and FIG. 4 is a schematic diagram illustrating an enlargement of a portion of FIG. 3, wherein the vehicle 12 is stopped at region 76 of transit stop 78.

The vehicle lanes 72 of roadway 70 typically may be used by motorized vehicles (such as vehicle 12). The bicycle or pedestrian lane 74 may, in accordance with local laws, be used by cyclists, walking or running pedestrians, physically-impaired pedestrians, persons on roller skates or roller blades, persons on scooters, persons on hoverboards, and the like. In at least some examples, bicycle or pedestrian lane 74 may be sandwiched between the vehicle lane(s) 72 and transit stop 78. Thus, as passengers ingress/egress vehicle 12 toward transit stop 78, a potential collision could occur.

Transit stop 78 may be a predetermined transit stop (e.g., such as a bus station or a taxi or other ride-share vehicle lane (e.g., for Uber™ or Lyft™ pick-ups, drop-offs, or the like)). For example, municipal convention centers, airports, and other high-traffic foot-traffic areas may allot a region for passengers to wait for public transportation and to be dropped off (so as to not interfere with other local traffic). In other examples, transit stop 78 may be an impromptu transit stop—meaning transit stop 78 may be any roadside area where the vehicle 12 may lawfully stop to pick-up or drop-off a passenger (e.g., adjacent a restaurant, a theatre, a sporting area, etc.). As used herein, a region (76) of the transit stop 78 means at least a length of transit stop 78 that corresponds with a length of the specific vehicle 12; it may also comprise a width dimension. In the illustrated example, the region 76 is adjacent the bicycle or pedestrian lane 74 and includes at least part of the footpath zone 40 (previously described).

Figure 5:
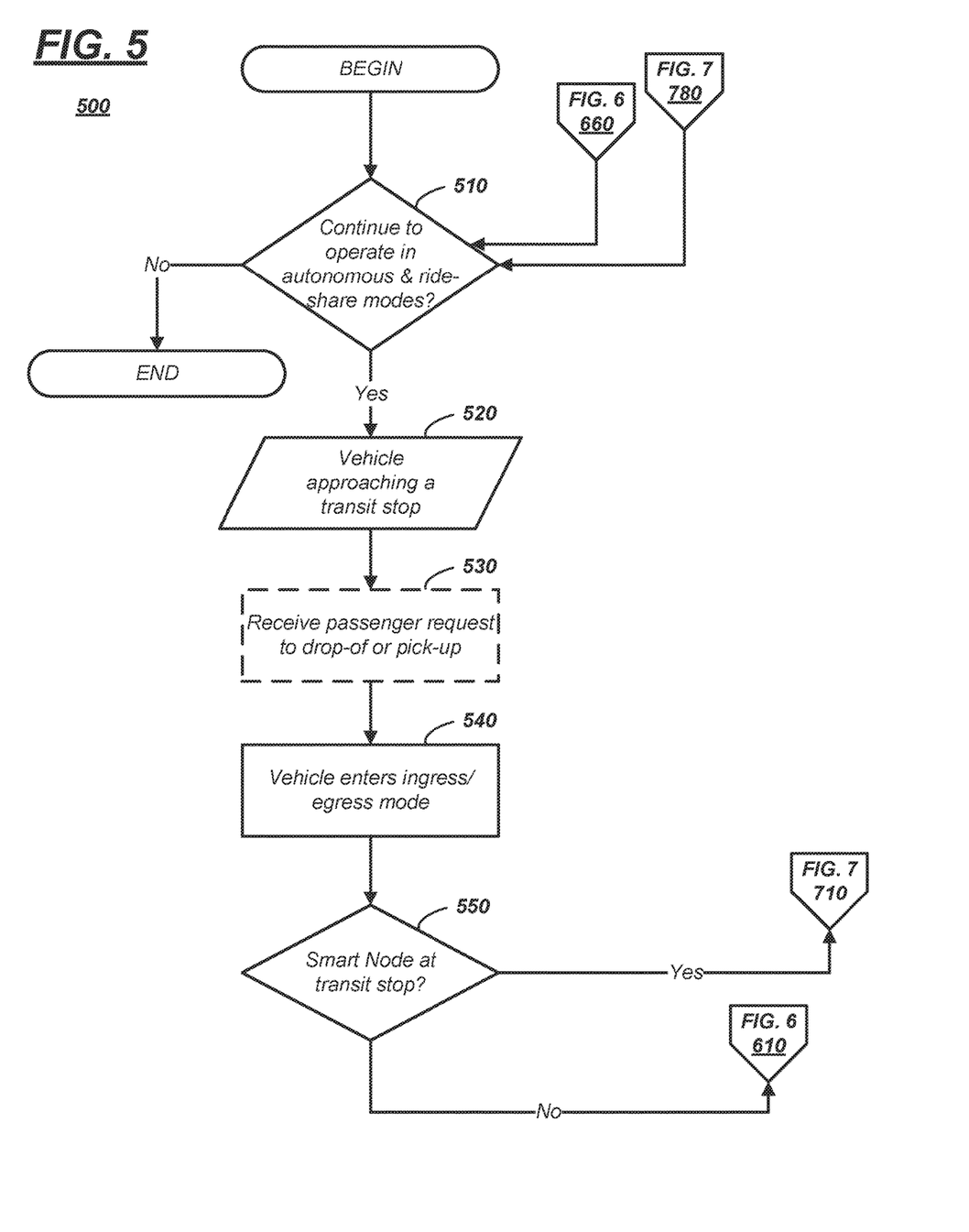
FIGS. 5-7 illustrate an example process of the vehicle—operating in an autonomous mode—facilitating passenger ingress/egress at a transit stop.
Figure 6:
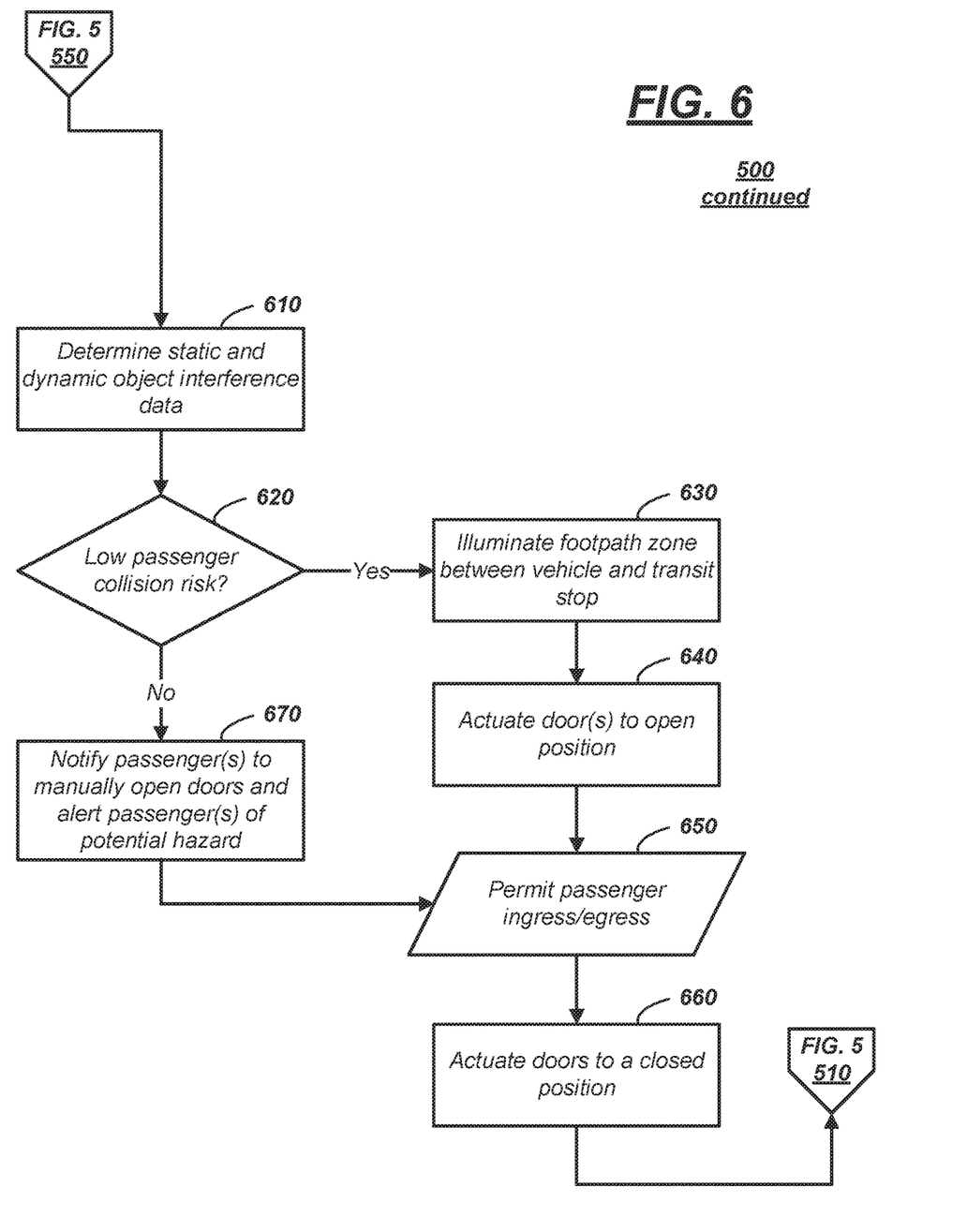
Figure 7:
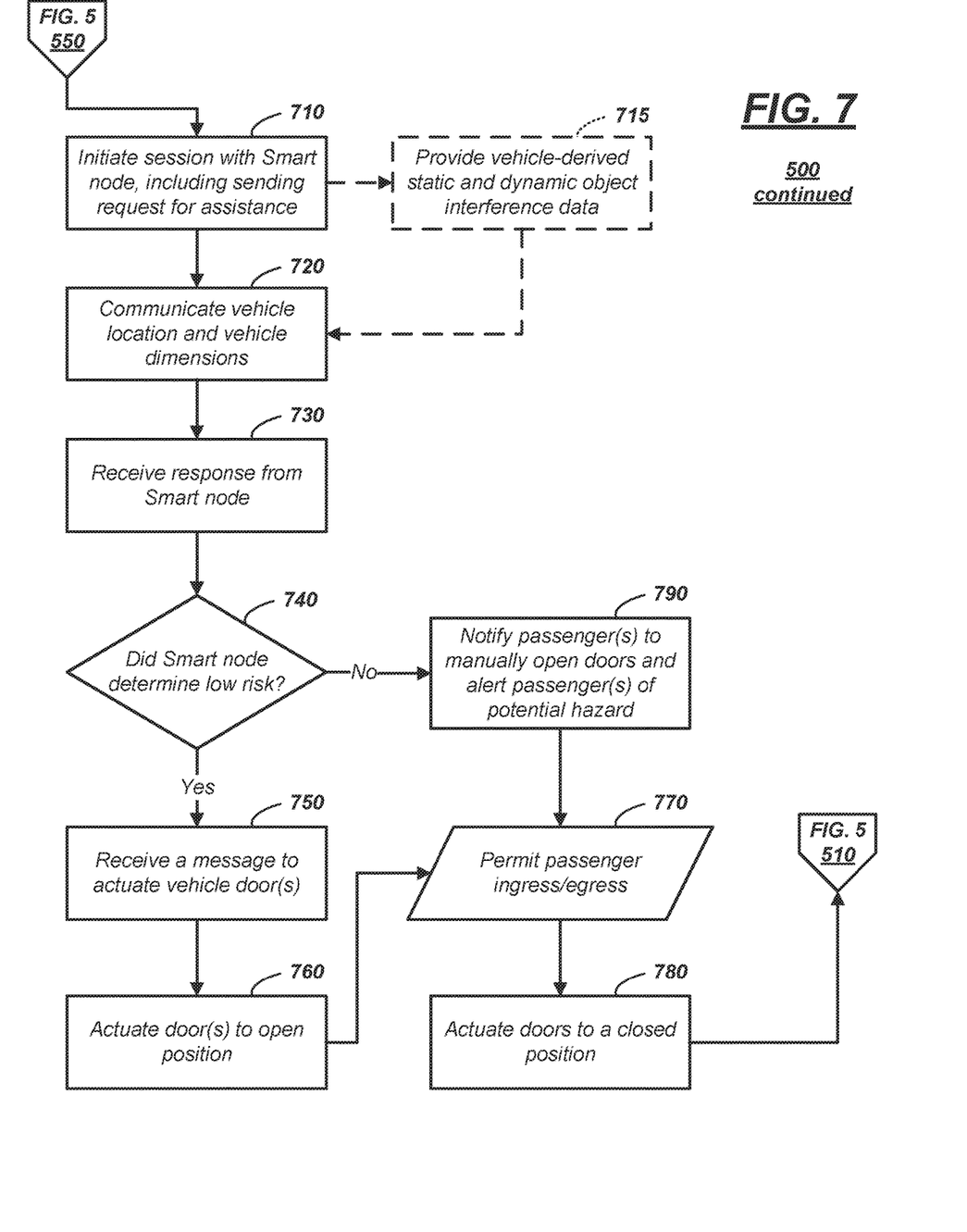

Turning now to FIGS. 5-7, an example process 500 of operating the vehicle 12 (in an autonomous mode) to facilitate passenger ingress/egress at a transit stop is described. As will be described more below, the process 500 may comprise computer 14 determining whether to actuate at least one vehicle door 30 to an open position based on assessment by computer 14 (or by smart node 16) of a low passenger collision risk.

Process 500 may begin with block 510 (FIG. 5). In block 510, computer 14 may determine whether to continue to operate the vehicle in an autonomous mode and a ride-share mode. In at least one example, the autonomous mode is a fully autonomous mode (e.g., Level 5) and the ride-share mode refers to operating to pick-up and drop-off passengers at transit stops 78. When computer 14 determines to continue to operate in the autonomous and ride-share modes, process 500 continues to block 520. If not, the process ends.

In block 520 which may follow, vehicle 12 may be moving and may approach a transit stop 78. This block may include computer 14 controlling the vehicle 12 in the fully autonomous mode.

In block 530, computer 14 may receive a ride-share request to be picked up or dropped off. According to one example, a passenger within the vehicle 12 may notify the vehicle 12 of his/her desire to egress the vehicle 12 at the particular transit stop (e.g., via a user interface within vehicle 12 or using a Smart phone or other wireless device). In another example, a passenger at the transit stop 78 may hail the vehicle 12 (e.g., by gesture or using a Smart phone or other wireless device). Block 530 may occur before block 520, after block 520, or concurrently with block 520.

In block 540 which follows, computer 14 may command vehicle 12 to enter an ingress/egress mode at the transit stop 78. To enter the ingress/egress mode, vehicle 12 may reduce speed to zero (0 miles per hour (mph)) and/or place a vehicle transmission in a PARK state. In ingress/egress mode, the region 76 of the transit stop 78 may be defined (based on where the vehicle 12 stopped and the length of the vehicle 12). Further, according to at least one example, a bicycle or pedestrian lane 74 may extend at least partially longitudinally (parallel to a longitudinal axis X of vehicle 12), wherein the bicycle or pedestrian lane 74 is between the transit stop 78 and vehicle 12 (e.g., as shown in FIG. 4).

In block 550 which may follow block 540, vehicle 12 may determine whether a smart node 16 exists at the transit stop 78. As discussed previously, not all transit stops will have one or more smart nodes 16. When no smart nodes 16 are present, the process proceeds to block 610 (FIG. 6). And when at least one smart node 16 is present, the process proceeds to block 710 (FIG. 7). It should be appreciated that in some examples, block 550 may occur prior to and/or during block 540 (e.g., in some instances, computer 14 may identify a smart node 16 at the transit stop 78 prior to the vehicle 12 being fully stopped or in the PARK state).

Turning to the continuing process 500 shown in FIG. 6, the figure illustrates that block 610 may proceed from block 550. In block 610, computer 14 receives sensor data from one or more sensors 24. In at least one example, computer 14 receives sensor data from at least a LIDAR sensor and a camera sensor and then, using the sensor data, determines static and dynamic interference data. To illustrate an example of an illustrative use-case scenario, computer 14 may determine whether a static object (e.g., such as a pole or other structure) will interference with door(s) 30 or passengers which are about to ingress/egress. To illustrate another example (e.g., according to the present (illustrative) use-case scenario), computer 14 may determine whether a moving object (e.g., a cyclist) is traversing the bicycle or passenger lane 74 and still further, whether that moving object (based on speed and heading) is likely to collide with passengers which are about to ingress/egress the vehicle 12 through door(s) 30.

In block 620 which follows, computer 14 may determine object interference information with respect to a footpath zone of the vehicle; and based on object interference information, determine whether or not to actuate the vehicle door to the open position. For example, block 620 may include computer 14 determining whether a low passenger collision risk exists—e.g., whether the risk of collision between the moving object and a passenger ingressing/egressing is less than a predetermined threshold. If the risk is determined to be low, then process 500 proceeds to block 630. If the risk is determined to be equal to or higher than the predetermined threshold, then the process 500 proceeds to block 670.

In block 630, the computer 14 has determined a low collision risk. Here, computer 14 may control light source 26 to illuminate the footpath zone 40 between the vehicle 12 and the transit stop 78.

In block 640 which may follow, computer 14 may control the actuator 28 to actuate at least one vehicle door 30 to an open position.

In block 650 which may follow, passengers may be permitted to ingress/egress the cabin of vehicle 12.

Using sensor data from sensor(s) 24, the computer 14 may determine that passenger ingress/egress is completed (at least for the present transit stop 78). Thus, in block 660 which may follow, computer 14 may control the actuator 28 to actuate the at least one vehicle door 30 to a closed position. Thereafter, process 500 may loop back to block 510 (FIG. 5) to determine whether to continue to operate the vehicle in an autonomous and ride-share mode.

Returning to block 670, here (following block 620) the computer 14 has determined that a risk is higher than the aforementioned low collision risk. When the computer 14 determines that a potential collision with a moving object is equal to or higher than the predetermined threshold, computer 14 may notify passenger(s) to manually open the door 30 and alert the passenger(s) of a potential collision hazard. For example, computer 14 may control the passenger notification system 32 to provide passengers an audio or visual notification that includes text such as: "Warning: cyclist approaching vehicle in bike lane. Open doors slowly and look both ways before ingressing/egressing the vehicle." Following block 670, process 500 may proceed to block 650 and then to block 660 and then block 550 (which blocks were previously described).

Now turning to FIG. 7 (also illustrating the continuing process 500), the figure illustrates that block 710 may proceed from block 550. Recall that process 500 proceeds to block 710 when computer 14 determines that a smart node 16 is nearby (e.g., within range). In block 710, computer 14 may initiate a session with smart node 16 via a SRWC link (using the wireless communication device 60 of smart node 16 and the wireless communication device 36 of vehicle 12); the session may include sending a request for assistance with passenger ingress/egress. In at least some examples, the request may include a query regarding whether to actuate (by control of computer 14) the vehicle door(s) 30 to an open position.

Optionally, in block 715 (which may follow), computer 14 may provide, via the SRWC link, vehicle-derived static and dynamic object interference data to smart node 16. For example, computer 14 may provide information identical to or similar to that which may be determined in block 610. As this block is optional, process 500 may (in other examples) proceed directly from block 710 to block 720 instead.

In block 720 (which follows block 710 or block 715), computer 14 may communicate, via the SRWC link, a location of vehicle 12 and its dimensions. Thus, for example, computer 14 may obtain from the positioning device 34 a location of vehicle 12 (now stopped and/or in the PARK state). The location may have an accuracy tolerance of 30 centimeters (cm). Further, the location may reference a reference point of the vehicle 12. Dimensions of the vehicle 12 may be stored in memory 22 and be described relative to the reference point; thus, in block 720, computer 14 may read at least a length and width of vehicle 12 from memory 22 and then provide this spatial footprint to the smart node 16 (the spatial footprint being defined when the door(s) 30 are in the closed position). Block 720 could include other vehicle data as well—e.g., such as information regarding the location of vehicle door(s) 30, the manner in which the door(s) 30 move from an open position to a closed position (e.g., slide, pivot, etc.), the amount (if any) in which the vehicle door(s) 30 move outward from the spatial footprint of the vehicle 12, etc. As explained more below, this information may be used by the smart node 16 to identify potential collision hazards; in some cases, this information is merely to determine—at the smart node 16—redundancy (e.g., to improve system accuracy).

In block 730 which may follow, computer 14 may receive a response from the smart node 16. The response may indicate that the smart node 16 is available to participate in the requested assistance.

Following block 730, in block 740, computer 14 may determine whether the smart node 16 determined that the risk of the vehicle actuating the door(s) 30 was low risk (i.e., less than the predetermined threshold discussed above). Thus, block 740 may include computer 14 waiting (at least momentarily) for an affirmative or a negative response from smart node 16, wherein an affirmative response (to the query) equates to an indication that the vehicle door(s) 30 may be actuated to an open position without interference of static or moving objects, wherein a negative response (to the query) equates to an indication that the vehicle door(s) 30 should not be actuated to an open position due to a potential interference of static or moving objects. If the smart node determines (and communicates to computer 14) an affirmative response (low risk exists), then process 500 proceeds to block 750. And if the smart node determines (and communicates to computer 14) a negative response (higher risk exists), then process 500 proceeds to block 790.

In block 750 which follows, computer 14 receives a message indicating that it should actuate the vehicle door(s) 30 to the open position (namely, low risk has been assessed by smart node 16).

And in block 760 which follows, computer 14 controls the actuator 28 in order to move the vehicle door(s) 30 from the closed position to the open position.

In block 770 which may follow, passengers may be permitted to ingress/egress the cabin of vehicle 12. (This block may be identical to block 650, described above.)

Block 780 may follow. Using sensor data from sensor(s) 24 (and/or additional data from smart node 16), the computer 14 may determine that passenger ingress/egress is completed (at least for the present transit stop 78). Thus, in block 780, computer 14 may control the actuator 28 to actuate the vehicle door(s) 30 to the closed position. Once in the closed position, computer 14 may terminate the session with smart node 16. Thereafter, process 500 may loop back to block 510 (FIG. 5) to determine whether to continue to operate the vehicle in the autonomous and ride-share modes.

Returning to block 790 (following block 740), recall that here the smart node 16 has determined that a risk is higher than the aforementioned low collision risk), and smart node 16 has communicated this to computer 14. Thus, computer 14 may notify passenger(s) to manually open the door 30 and alert the passenger(s) of a potential collision hazard. For example, computer 14 may control the passenger notification system 32 to provide passengers an audio and/or visual notification that includes text such as: "Warning: cyclist approaching vehicle in bike lane. Open doors slowly and look both ways before ingressing/egressing the vehicle." Following block 790, process 500 may proceed to block 770 and then to block 780 and then to block 550 (which blocks were previously described).

It should be appreciated that operation of vehicle 12 in the fully autonomous mode and/or the ride-share mode places a significant computational burden on computer 14. Accordingly, where smart nodes 16 having computers 50 are available, this may reduce the computational burden otherwise placed on the vehicle 12.

Figure 8:
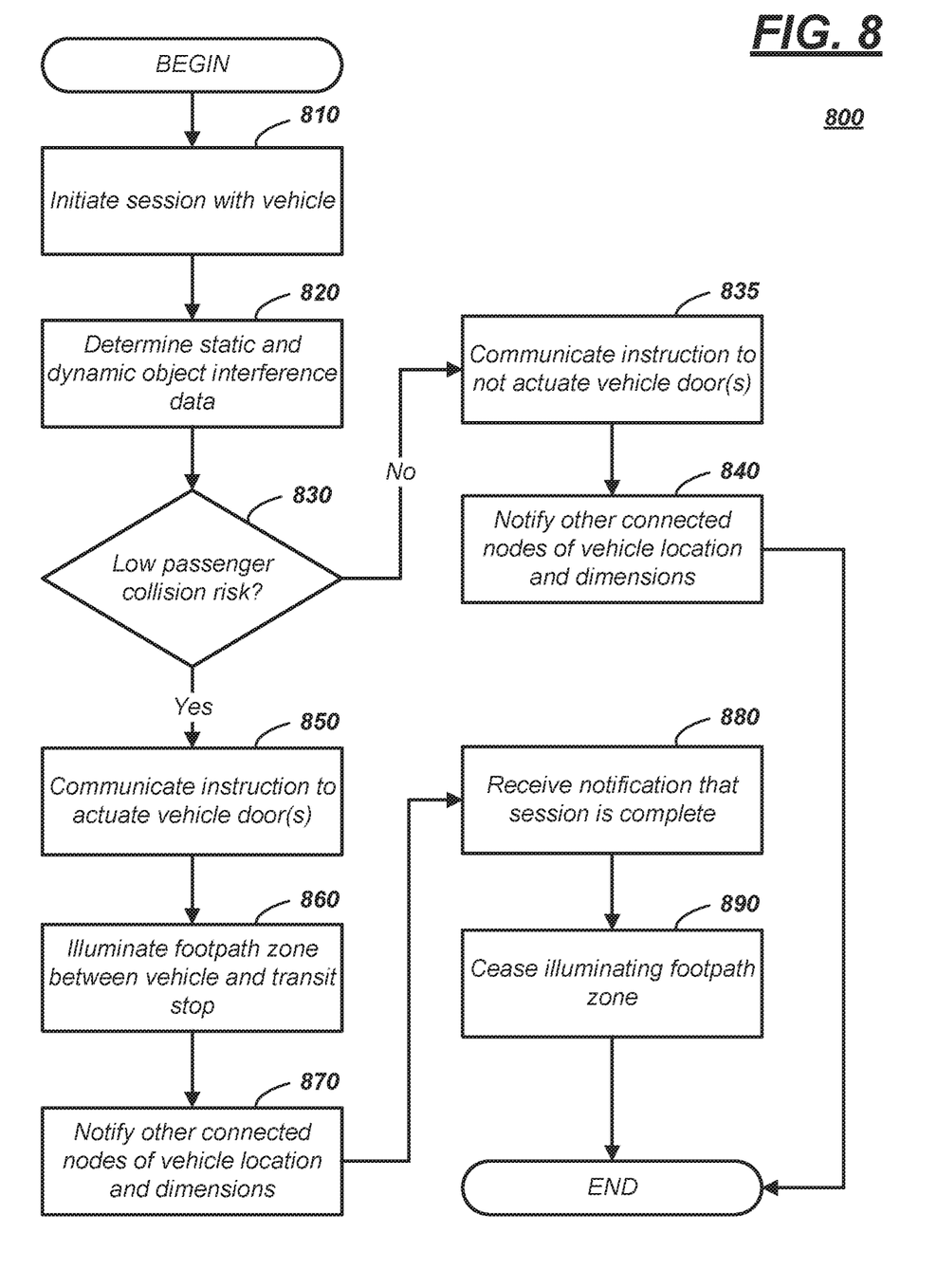
FIG. 8 illustrates an example process of the smart node facilitating passenger ingress/egress at the transit stop.

Turning now to FIG. 8, an example process 800 of operating the smart node 16 to facilitate passenger ingress/egress at a transit stop is described, wherein the smart node 16 is interacting with a corresponding vehicle (12) that is operating in the autonomous and ride-sharing modes. As will be described more below, the process 800 may comprise computer 50 determining whether to instruct vehicle 12 to actuate at least one vehicle door 30 to the open position based on assessment by computer 50 of a low passenger collision risk.

Process 800 may begin with block 810. In block 810, computer 50 may determine to initiate a session with vehicle 12. The session may be established using a SRWC link (using the wireless communication device 60 of smart node 16 and the wireless communication device 36 of vehicle 12). Once established, block 810 may include receiving (from computer 14) a request for assistance with passenger ingress/egress (e.g., that includes the query previously-discussed); further, smart node 16 may reply that it is available to assist. In some examples, block 810 further comprises receiving from the computer 14 a location of the vehicle 12 and its dimensions (e.g., as set forth by way of example in block 720).

In block 820, smart node 16 receives sensor data from one or more sensors 56. In at least one example, computer 50 receives sensor data from at least a LIDAR sensor and a camera sensor and then, using the sensor data, determines static and dynamic interference data. To illustrate an example of an illustrative use-case scenario, computer 50 may determine whether a static object (e.g., such as a pole or other structure) will interference with door(s) 30 or passengers which are about to ingress/egress. To illustrate another example (e.g., according to the present (illustrative) use-case scenario), computer 50 may determine whether a moving object (e.g., a cyclist) is traversing the bicycle or passenger lane 74 and still further, whether that moving object (based on speed and heading) is likely to collide with passengers which may be about to ingress/egress the vehicle 12.

In block 830 which follows, computer 50 may determine whether a low passenger collision risk exists—e.g., whether the risk of collision of a passenger ingressing/egressing is less than a predetermined threshold. If the risk is determined to be low, then process 800 proceeds to block 850. If the risk is determined to be equal to or higher than the predetermined threshold, then the process 800 proceeds to block 835.

In block 835, computer 50 communicates an instruction to computer 14, via the SRWC link, wherein the instruction is to not actuate the vehicle door(s) 30 to the open position (e.g., due to the potential hazard).

In block 840, computer 50 optionally may notify other connected smart nodes of the location of vehicle 12 and its dimensions (e.g., the data communicated in block 810). In this manner, computer 50 may notify other smart nodes of a potential hazard. Following block 840, the process 800 may end.

Returning to block 850, in block 850, computer 50 may communicate, via the SRWC link, an instructions to computer 14 to actuate the vehicle door(s) 30. That is, if the smart node 16 determines the likelihood of a collision hazard is sufficiently low (at block 830), then it may advise computer 14 to proceed to actuate the door(s) 30 for its passengers.

In block 860 which may follow, computer 50 may control light source 58 (actuating it to an ON state) to illuminate the footpath zone 40 between the vehicle 12 and the transit stop 78 (while the vehicle door(s) 30 are in the open position). In some examples, this may include computer 50 controlling the steering mechanism 62 to move a beam of the light source 58 to the footpath zone 40. Of course, the footpath zone 40 may be determined by computer 50 using one or more of: the vehicle location provided in block 810, the vehicle dimensions provided in block 810, or the sensor data from sensors 56 (obtained in block 820).

Block 870 may follow—e.g., smart node 16 may notify other connected smart nodes of the location of vehicle 12 and its dimensions. This block may be identical to block 840; therefore, it will not be re-described here. Further, block 870 may occur prior to block 860 in some examples.

In block 880 which may follow, computer 50 may receive a notification, from vehicle 12, that the session is complete (and being terminated).

In response to block 880, in block 890, computer 50 may control light source 58 (actuating it to an OFF state) so that it ceases to illuminate the footpath zone 40. Following block 890, the process 800 may end.

Other examples of processes 500 and 800 exist as well. For example, in block 620, the computer 14 could further identify whether a stationary object will obstruct the opening of the door(s) 30 or whether such a stationary object will impede passenger ingress/egress. This may include determining whether a stationary object is located in or near the footpath zone 40. Similarly, in block 740 or block 830, the smart node 16 may determine whether a stationary object will obstruct the opening of the door(s) 30 or impede passenger ingress/egress (and communicate this to vehicle 12).

Thus, there has been described a ride-share system that facilitates passenger ingress and/or passenger egress. The system comprises a vehicle operating in an autonomous mode and an onboard computer that controls, among other things, when to actuate a vehicle door. In some examples, the system further comprise infrastructure—e.g., a smart node—that wirelessly communicates with the vehicle and instructs the vehicle regarding whether to automatically open the door or not based on situational awareness of existing or predicted static and dynamic interferences.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A ride-share system, comprising:
one or more processors and memory storing instructions that are executable by the one or more processors, the instructions comprising:
while operating a vehicle in an autonomous mode, determine a transit stop;
based on the determination, attempt to establish communication with a smart node;
when communication is established with the smart node, query the smart node regarding whether to actuate a vehicle door to an open position; and
when communication is not established with the smart node, determine whether to actuate the vehicle door to the open position.

2. The system of claim 1, further comprising a vehicle door actuator that moves a door between the open position and a closed position, wherein the vehicle door actuator is communicatively coupled to the one or more processors.

3. The system of claim 2, further comprising:
a light source directed to illuminate a footpath zone of the vehicle;
a positioning device that is configured to identify a location of the vehicle;
a wireless communication device; and
a passenger notification system,
wherein the light source, the positioning device, the wireless communication device and the passenger notification system are communicatively coupled to the one or more processors.

4. The system of claim 1, wherein the instructions further comprise, to: receive a ride-share request, wherein the request pertains to a passenger pick-up or a passenger drop-off.

5. The system of claim 1, wherein the query is executed when a transmission of the vehicle is in a PARK state.

6. The system of claim 5, wherein the instructions further comprise, to: provide, to the smart node, a location of the vehicle and vehicle dimensions.

7. The system of claim 1, wherein the instructions further comprise, to:
receive, from the smart node, an affirmative response indicating to actuate the vehicle door to the open position; and then
actuate the vehicle door to the open position to permit passenger ingress or passenger egress.

8. The system of claim 7, wherein the instructions further comprise, to: illuminate a footpath zone of the vehicle; and actuate the vehicle door to the closed position.

9. The system of claim 1, wherein the instructions further comprise, to:
receive, from the smart node, a negative response indicating to not actuate the vehicle door to the open position; and then,
provide a notification to passenger(s) to manually open the vehicle door.

10. The system of claim 9, wherein the instructions further comprise, to: provide a notification to the passenger(s) regarding a potential hazard.

11. The system of claim 10, wherein the potential hazard is an object moving into a footpath zone of the vehicle or a pole or other static structure.

12. The system of claim 11, wherein the object comprises a cyclist, a walking or running pedestrian, a physically-impaired pedestrian, a person on roller skates or roller blades, a person on a scooter, or a person on a hoverboard.

13. The system of claim 1, wherein, when communication is not established with the smart node, the instructions further comprise, to:
determine object interference information with respect to a footpath zone of the vehicle;
based on object interference information, determine to actuate the vehicle door to the open position;
actuate a light source of the vehicle to illuminate the footpath zone; and
actuate the vehicle door to the open position to permit passenger ingress or passenger egress.

14. The system of claim 1, wherein, when communication is not established with the smart node, the instructions further comprise, to:
determine object interference information with respect to a footpath zone of the vehicle;
based on object interference information, determine to not actuate the vehicle door to the open position; and
provide a notification to passenger(s) to manually open the vehicle door.

15. The system of claim 14, wherein the instructions further comprise, to: provide a notification to the passenger(s) regarding a potential hazard.

16. The system of claim 15, wherein the potential hazard is an object moving into a footpath zone of the vehicle or a pole or other static structure.

17. The system of claim 16, wherein the object comprises a cyclist, a walking or running pedestrian, a physically-impaired pedestrian, a person on roller skates or roller blades, a person on a scooter, or a person on a hoverboard.

* * * * *